May 14, 1968 A. RYEN 3,383,086
BUTTERFLY VALVES AND THE LIKE
Filed July 12, 1966
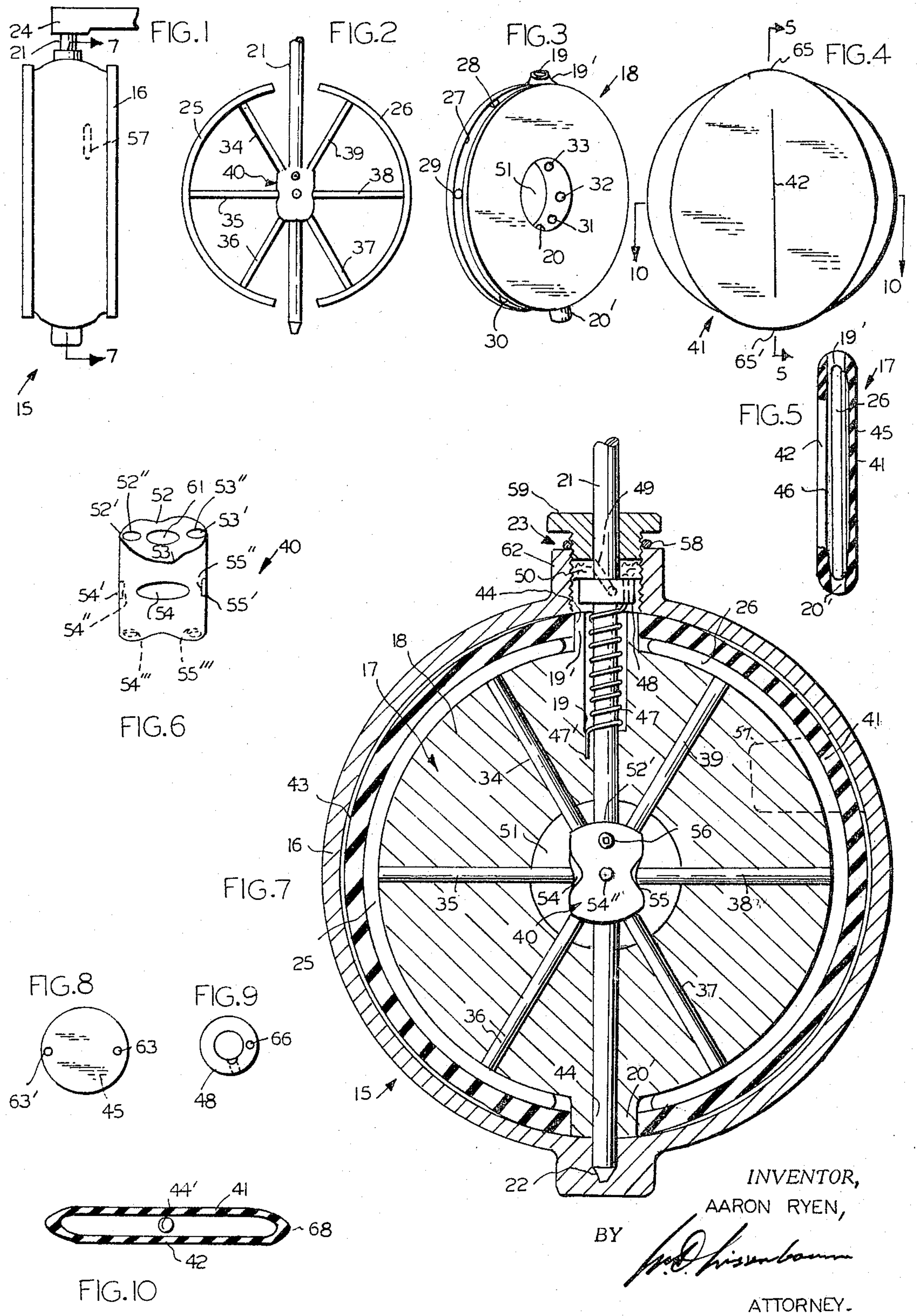
INVENTOR,
AARON RYEN,
BY
ATTORNEY.

United States Patent Office 3,383,086 Patented May 14, 1968

3,383,086
BUTTERFLY VALVES AND THE LIKE
Aaron Ryen, 215 E. Madison Ave., Collingswood, N.J.
Filed July 12, 1966, Ser. No. 564,668
9 Claims. (Cl. 251—188)

The present invention relates to butterfly valves, throttle valves and the like, whose general construction comprises a disc turning on a diametral axis inside a valve body which may be a pipe or barrel.

Heretofore, in valves of this class, the periphery of the disc member was in wiping frictional contact with its associated barrel, during the last stage of closing and the first stage of opening. The resulting wear caused leaks. Many attempts have been made to remedy this. Proposed resilient barrel linings in some, and the use of resiliently bendable metal discs in others, have not wholly solved the problem, because it was still mandatory for them to retain said frictional wiping actions. Constructions to attain a tighter fit in closed condition, made it more difficult to overcome the friction of the wiping actions, and tightness substantially increased the torsional effort required to operate the valve.

It is therefore the principal object of this invention to provide a novel and improved construction for this type of valve, in which there is no wiping action by the disc. In fact, except at the pintles, no part of the periphery of the disc structure is ever in contact with the barrel during turning movement of the disc structure.

A further object thereof is to provide a novel and improved construction for a valve of this kind, involving a new mode of operation which automatically effects a proper seal only after the disc is made stationary at closing position.

Still another object of this invention is to provide a novel and improved valve of the character described, having the mentioned attributes, and which is efficient in carrying out the purposes for which it is designed.

Other objects and advantages will become apparent as this disclosure proceeds.

For one practice of this invention, the disc structure within the barrel body, comprises a flat ring having a pair of oppositely directed radial bores along a diameter, carrying a single shaft therethrough which extends out of the valve body where it is provided with an operating handle. This shaft is free to turn in said bores and of course is suitably journalled in bearings on the valve body. That part of said shaft which is exposed in the hole of said ring, carries a cam fixed thereon. Said ring is snug within a round, comparatively thin casing or envelope made of resilient rubber-like material. The normal outside diameter of said envelope is slightly less than the barrel diameter, but in sealing contact at the pintle regions. Said ring has a segmental peripheral band loose thereon, but pressed thereto by the peripheral wall of said resilient envelope. Slidable pusher rods through radial holes in the flat ring, bear against said cam at one of their ends, and against said segmental band at the other. A torsion spring connection links said shaft and ring. The disc structure comes against a stop when in closing position. When the shaft is turned to close the valve, the disc structure will come against said stop. Then upon further turning of the shaft, the cam will shift all said pusher rods whereupon the segmental band will move outwardly and expand the diametral size of said resilient envelope. This effects an efficient seal, and the valve is in a tightly closed condition. Means are provided to hold the shaft at the furthest position it has been turned to, and of course such hold is releasable in order to open the valve.

In the accompanying drawing forming part of this specification, similar characters of reference indicate corresponding parts in all the views.

FIG. 1 is a side view of a valve embodying the teachings of this invention. A stop for the disc structure is shown.

FIG. 2 shows the valve stem or shaft as it is called herein, the cam it carries, the pusher rods which are followers of said cam, and the segmental band to be shifted by said followers, to cause diametrical enlargement of the outer resilient envelope.

FIG. 3 is a perspective view of the flat ring which carries all the parts shown in FIG. 2.

FIG. 4 is a face view of said resilient envelope, showing a slit for entering the parts to be contained therein.

FIG. 5 is a section taken at line 5—5 in FIG. 4, showing the completely assembled disc structure.

FIG. 6 is a perspective view of the cam.

FIG. 7 is an enlarged section taken at line 7—7 in FIG. 1.

FIG. 8 is a face view of one of the cover plates for the ring's center hole.

FIG. 9 is a top plan view of a collar carried by the shaft, used to anchor one end of a torsion coil spring which is included in the assembly.

FIG. 10 is a section taken at line 10—10 in FIG. 4.

In the drawing, the specific valve illustrated, is designated generally by the numeral 15, and comprises a barrel valve body 16 of cylindrical interior, holding a disc structure denoted generally by the numeral 17, which consists of a generally flat ring 18 of suitable thickness to have two oppositely directed bores 19, 20 along a diameter, through which bores extends a shaft 21, free to turn therein. Said ring has bosses 19', 20' at such diameter extremities. One end of said shaft sets into a bearing socket 22, and the other end extends through bearing structure 23, and outwardly of the valve body where it has a handle 24. Said ring has a segmental peripheral band, here shown to comprise the two rod pieces 25, 26, positioned one to one side and the other to the other side of said shaft 21, up to near the shaft's bearings. Each of said rod pieces is bent in arcuate form of a bit less than a half circle, and preferably sits along and extends outwardly of a rather shallow peripheral groove as 27 in said ring 18. Said ring also has a series of radial bores which open in its periphery at each end of said arcuate pieces and at the mid-section of each of said arcuate pieces 25, 26. These holes, indicated by the numerals 28–33, hold slidably therethrough the pusher rods 34–39 respectively. That part of the shaft 21, which is exposed in the hole 51 of the ring 18, has fixed thereon the cam indicated generally by the numeral 40. Said ring and its appurtenances are snugly held in a resilient round envelope of for instance rubber or neoprene, denoted generally as 41, one face of which has a diametral slit 42. The interior of this envelope is generally cylindrical. Through its periphery, are the diametrically opposite openings 44, 44', which hug tightly, the diametrically opposite hubs 19', 20' respectively; said hubs being on the periphery of said ring 18. At the region of each of said hubs, the outside diameter of the casing, or envelope as it is herein referred to, is enlarged to contact the barrel 16; the extremities of such enlarged diameter being indicated by the numerals 65 and 65'. These enlargements make the envelope-shape slightly oval, so upon assembly of the valve, there is a slight shortening of said diameter, which causes a good seal where the envelope contacts the barrel. These enlargements are not abrupt, but gradually reduce to the general diameter of the envelope so the clearance between the peripheral wall of the envelope and the barrel exists substantially along the entire length of the band segments 25 and 26. Upon assembly, the periphery of said envelope 41 presses said band segments against the periphery of the ring 18. The normal outside diameter of said envelope is a bit less than the internal diameter of the barrel 16, so normally there will exist the space 43, except at the shaft bearings. A torsion coil spring 47, about the shaft 21, lying in a counterbore as shown, has one of its ends anchored in the body of the ring at 47′, and its other end is anchored in a collar 48 which is fixed to the shaft 21 by a pin 49. The numeral 50 indicates a packing.

The cam 40 is a cylindrical piece fashioned so that the contour of its upper face when deemed divided into four equal sectors, presents diametrically opposite depressions or low points 52 and 53, in alternate relation with diametrically opposite high points 52′, 53′. The surfaces of the sectors "flow" gradually between successive points to avoid abruptness so it will be easy to shift the pusher rods 34–39 when the cam is turned. The contour of the lower face is similar for action on the rods 36 and 37. The peripheral surface of the cam, for action on the rods 35, 38, has equivalent contour, in the provision of low points 54 and 55, and the alternately related high points 54′, 55′. All said rods are really cam followers from a low point to a high point, but the return of a rod to low point is brought about by the contraction of the resilient outer envelope 41. At each high point position of the cam, there is a slight socket. These are indicated by the numerals 52″, 53″ in the cam's upper face, and by the numerals 54‴, 55‴, in the cam's lower face, and by the numerals 54″, 55″ in the peripheral surface of said cam. Each of the pusher rods sets into one of these sockets when at the high points of the cam respectively. All said rods move simultaneously to the arcuate pieces 25, 26, or simultaneously away therefrom, by cam movement.

Consider the valve structure as wholly disassembled, so to assemble, first position the disc hole cover plate 45 over one end of the ring's hole, and secure said plate to the ring 18 with pins, not shown, through the holes 63, 63′. Set the pusher rods 34–39 into the holes 28–33 therefor provided respectively. Then place the arcuate rod pieces 25 and 26, one at each side of the shaft position, into the ring's peripheral groove 27. Now set this partially assembled disc structure within the stretchable rubber envelope 41, through the slit 42, while lining up, so the bosses 19′, 20′ of the ring enter snug into the openings 44 and 44′ of the envelope. Now set the disc structure, to the extent assembled, into the barrel 16, for which a little forcing will be needed to get it in. With the slit 42 held open for access, set the cam 40 into the center hole of the ring 18 so that the cam's hole 61, is in alignment with the holes 19, 20. While thus positioned, insert the shaft 21 through the bearing structure 23, then the hole 19, then through the cam's hole 61, and finally into the bearing socket 22. Now set the torsion coil spring 47 on the shaft 21, and into the counterbore of 19, and anchor the lower end of said spring into a socket 47′ therefor provided in the ring 18. Next, slide the collar 48 onto the shaft 21, and get the upper end of the coil spring 47 into the hole 66. Then drill a slanted hole through the shaft body and into the collar body, and insert therein the locking pin 49 to fix said collar to the shaft. Now position the cam 40, so that all of the pusher rods are at the lowest points of the cam's contour. With the set screw 56 in front, facing the opening afforded by the slit 42, tighten said screw to fix the cam 40 to the shaft 21. Now mount a cover plate 46 over the open end of the ring's center hole 51; the cover plates 46 and 45, being identical. The meeting edges of the slit 42 are now cemented, thus closing the envelope 41. Next, insert the packing 50 and complete by mounting the exteriorly threaded flanged bushing 59 and its locknut 58.

In operating, upon turning the shaft 21 by its handle 24, from open to closed position, the disc structure 17 will turn with said shaft because of its linkage through the spring 47. All this time, except at the bearings, the periphery of the resilient envelope 41 is out of contact with the barrel's interior, because the space 43 between them, is ever present until the disc structure 17 is brought to closing position, whereupon further turning of the shaft after the disc structure has been stopped by the stop 57, will cause the cam 40 to shift all the pusher rods 34–39 outwardly, and thus cause the arcuate pieces 25 and 26 to move, thereby expanding the periphery of the resilient casing 41. This closes the space 43, compresses the envelope's peripheral wall, and effects a seal. The valve is now securely closed. The inner tips of the pusher bars 34–39 having entered the shallow sockets 52″, 54″, 54‴, 55″, 55‴, and 53″ respectively, holds the shaft 21 from turning back against the urge of the stressed torsion spring 47. But to open the valve, upon reverse manually turning of the shaft 21, the hold of the pusher rods in said sockets will be undone, and upon the cam coming to the position where the pusher rods are on the low spots of the cam contours, which occurs without turning of the disc structure 17, the space 43 is again created, for the resilient envelope has contracted. It is such contraction of the peripheral wall of the envelope which pushed said rods inward.

It is preferred that the faces of the envelope be bevelled around their perimeters so the actual peripheral wall of the envelope is very narrow as shown at 68, so the stretching and compression action caused by the outward movement of the arcuate pieces 25, 26 against the envelope's peripheral wall is concentrated and localized to that part of the wall which bears against the barrel's interior when the disc structure is in position and condition to close the valve.

Of importance to note is that during all turning movement of the disc structure 17, there is an absence of wiping action between the bearing structures, on the barrel's interior.

This invention is applicable to barrels of different cross-section with their disc structures made to match respectively. In all instances, the shaft 21 would be along the disc plane, in symmetrical relation to the disc perimeter, which may be of any rectangle, regular polygon, or the general practice of having the disc structure circular as herein shown, or elliptical, and it is believed that all this is readily understandable to those versed in the art, so no further illustration is necessary.

This invention is capable of numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific showing and description herein, to indicate the scope of this invention.

I claim:

1. In a butterfly valve of the character described, the combination with a valve body, of a disc structure rotatably positioned therein for movement between an open position and a closing position; said disc structure comprising an outer envelope of resilient material, a generally flat ring member within said envelope, a shaft rotatably carried on said ring member along the face of said ring member and in symmetry in relation to the perimeter of said ring member; said shaft extending tightly but rotatably through the peripheral wall of said envelope and outwardly of said valve body, handle means on the exterior part of said shaft; said shaft being journalled on the valve body, a cam structure within said envelope, carried fixed on said shaft, a band structure loose on the periphery of said ring member and in longitudinal contact with nearly the entire inner peripheral wall surface of said envelope; there being a slight clearance between the peripheral wall of said envelope and the valve body only substantially along the entire extent of said band structure, a first means associated with said band structure and cam structure, positioned within said envelope and adapted to be moved by said cam structure whereupon said band structure will move away from said ring member in a direction away from the center of said disc structure, a stop element fixed within and to the valve body, adapted to stop the disc structure from turning when it has reached closing position, a second means associating said shaft and ring member, adapted when the shaft is turned in any direction, to turn the disc structure in the same direction, and when the shaft is turned to close the valve, allowing said shaft, after the disc structure is intercepted by said stop, to continue to be turned a predetermined amount; said second means including biasing means which biases the disc structure against said stop upon such continuation of the turning of the shaft; continuation of turning of said shaft after the disc structure has reached said stop, causing said cam structure to shift said first means whereby said band structure is moved away from the ring member and thereby effectively close the valve, and a third means to releasably hold the shaft at the furthest position it is turned to to cause movement of the band structure away from the ring member.

2. A valve as defined in claim 1, wherein said biasing means is a torsion coil spring about said shaft, having one of its ends anchored to said ring member and the other end thereof anchored to said shaft.

3. A valve as defined in claim 1, wherein the first means comprises a plurality of rods slidably positioned through radial holes in said ring member respectively; said shaft being in a radial bore in said ring structure and part of said shaft extending across the hole of said ring member; the cam structure being positioned on said shaft part; the outer ends of said rods contacting said band structure and the inner ends thereof contacting the cam structure.

4. A valve as defined in claim 3, wherein said biasing means is a torsion coil spring about said shaft and within said envelope, having one of its ends anchored to said ring member and the other end thereof anchored to said shaft; said spring being within a counterbore of said bore.

5. A valve as defined in claim 3, wherein the band structure comprises two substantially identical arcuate pieces, one at one side and the other at the other side of said shaft.

6. A valve as defined in claim 5, wherein said pusher rods are at least six in number, angularly equispaced and in symmetry with said shaft; three of said rods being to one side and the other three being to the other side of the shaft; each of said arcuate pieces being contacted near the ends and at mid-region by a pusher rod.

7. A valve as defined in claim 5, wherein the third means is provided by having relatively shallow sockets in the cam structure, so positioned that said rods respectively set in them and are releasably engaged thereby when the disc structure is in closed position; disengagement thereof being effected by turning the shaft to open the valve.

8. A valve as defined in claim 5, wherein said rods are six in number, angularly equispaced and in symmetry with said shaft; three of said rods being to one side and the other three being to the other side of said shaft; each of said arcuate pieces being contacted near its ends and at mid-region by a pusher rod, and wherein the cam structure is a cylindrical piece extending along and encircling the shaft; the periphery of said cam having two high points and two low points in alternate relation and gradual slopes between successive points; each of the end faces of said cam having two high points and two low points in alternate relation and gradual slopes between successive points respectively; corresponding points being contacted by the inner ends of said rods respectively so that upon turning said cam in relation to said ring member, all of said rods will simultaneously contact corresponding points on the cam; said slopes being such that the rod ends easily ride on the cam when the cam is turned with respect to the ring member.

9. A valve as defined in claim 8, wherein the third means is provided by having relatively shallow sockets in the cam, one at each high point thereof, so said rods respectively set in them and are releasably engaged thereby when the disc structure is in closed position; disengagement thereof being effected by turning the shaft to open the valve.

References Cited

UNITED STATES PATENTS 2,945,667 7/1960 Bibbo ---------- 251—306 XR
3,186,682 6/1965 Pierson ------------ 251—306

FOREIGN PATENTS 866,284 2/1953 Germany.

WILLIAM F. O'DEA, *Primary Examiner.*

H. W. WEAKLEY, *Examiner.*